UNITED STATES PATENT OFFICE.

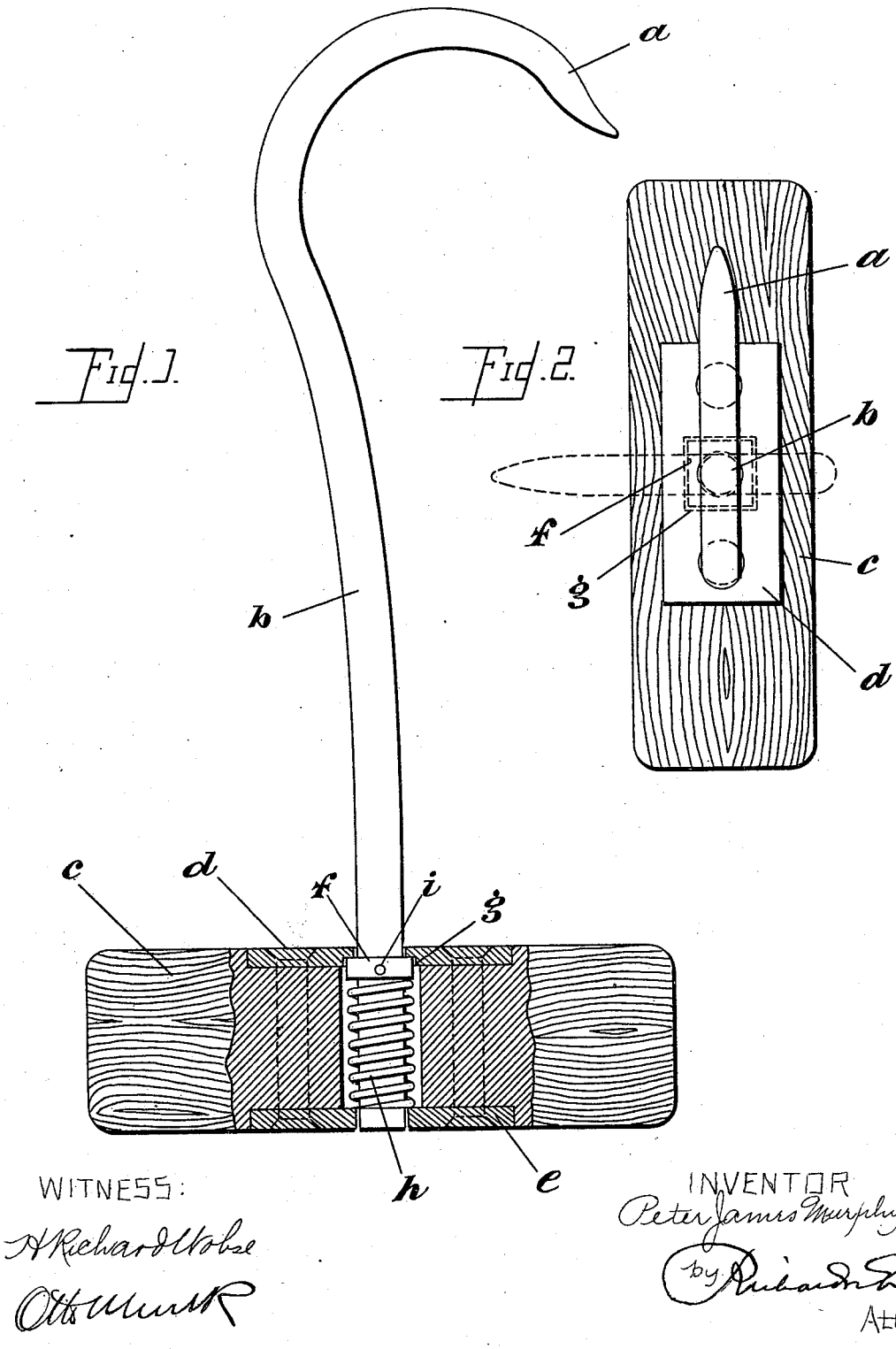

PETER J. MURPHY, OF BOOTLE, ENGLAND.

COTTON-HOOK.

SPECIFICATION forming part of Letters Patent No. 580,949, dated April 20, 1897.

Application filed December 16, 1896. Serial No. 615,885. (No model.)

*To all whom it may concern:*

Be it known that I, PETER JAMES MURPHY, a subject of the Queen of Great Britain and Ireland, residing at 100 Peel Road, Bootle, county of Lancaster, England, have invented a certain new and useful Cotton-Hook, of which the following is a specification.

This invention relates to hooks commonly called "cotton-hooks" or "dog-hooks," which are used by dock laborers, porters, carters, and others in handling cargo, cotton-bales, railway-freight goods, and the like.

It is the habit of those who use such hooks to thrust them, when not required, under their waist-belts, and when this is done the point of the hook projects from the body somewhat dangerously, the hook and handle being commonly at right angles to each other.

According to this invention I so construct a cotton-hook that its shank is movable in its handle, in order that the plane of the hook may be at right angles with the handle for working purposes and may be turned around parallel with the handle for the purpose of being thrust beneath the waist-belt.

Figure 1 of the annexed drawings illustrates a cotton-hook according to my invention, Fig. 2 being a plan thereof.

$a$ is the hook, $b$ its shank, and $c$ its handle. The shank $b$ is held by the two plates $d$ and $e$, which are riveted to the handle $c$. A square nut or formation $f$ on the shank $b$ lies in a corresponding countersink $g$ in the plate $d$ and is held, for the time being, rigidly therein by the spiral spring $h$, which encircles the shank $b$ and abuts against the nut $f$ and plate $e$, respectively. The nut $f$ may be screwed upon the shank $b$ or may be secured thereon by a key-pin $i$.

To turn the hook $a$ so as to lie parallel with the handle $c$, the shank $b$ is pushed into the handle against the spring $h$ until the nut $f$ is clear of the recess $g$ in the plate $d$. The shank $b$ is then turned through one-quarter of a circle and allowed to spring outwardly again. The same operation is repeated when it is desired that the hook $a$ shall be at right angles with the handle $c$ for working purposes.

Having now described my invention, what I claim as new, and desire to secure by Letters Patent, is—

In combination with the hook and the shank thereof, the square collar $f$ thereon, the handle having an opening receiving the end of the shank, the plates $d$ and $e$ on opposite sides of the handle having openings through which the shank passes, one of said plates having a socket therein to receive the square collar, and the spring $h$ interposed between said square collar and the plate $e$, substantially as described.

In witness whereof I have hereunto set my hand in presence of two witnesses.

P. J. MURPHY.

Witnesses:
 JOHN HOWARD,
 J. A. CONBROUGH.